United States Patent
Sobus et al.

(10) Patent No.: US 9,100,486 B2
(45) Date of Patent: Aug. 4, 2015

(54) MANAGING TRANSACTION COMPLEXITY IN A CONTACT CENTER

(71) Applicant: Avaya Inc., Basking Ridge, NJ (US)

(72) Inventors: Katherine A. Sobus, Wilmington, DE (US); Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/023,218

(22) Filed: Sep. 10, 2013

(65) Prior Publication Data

US 2015/0071428 A1 Mar. 12, 2015

(51) Int. Cl.
*H04M 3/00* (2006.01)
*H04M 3/523* (2006.01)

(52) U.S. Cl.
CPC .................................. *H04M 3/5232* (2013.01)

(58) Field of Classification Search
CPC . H04M 3/5233; H04M 3/5183; H04M 3/523; H04M 3/5232; H04M 3/5191
USPC ........................... 379/265.01–265.02, 265.13
See application file for complete search history.

(56) References Cited

U.S. PATENT DOCUMENTS

| | | | |
|---|---|---|---|
| 6,553,114 B1 | 4/2003 | Fisher et al. | |
| 6,662,171 B1 * | 12/2003 | Goertz | 706/45 |
| 6,663,114 B2 | 12/2003 | Lamela et al. | |
| 2006/0233346 A1 * | 10/2006 | McIlwaine et al. | 379/265.02 |
| 2008/0260128 A1 * | 10/2008 | Conway et al. | 379/201.02 |
| 2009/0262923 A1 * | 10/2009 | Anerousis et al. | 379/265.09 |
| 2012/0215579 A1 | 8/2012 | O'Connor et al. | |
| 2013/0041838 A1 | 2/2013 | Fagundes et al. | |

* cited by examiner

*Primary Examiner* — Rasha Al Aubaidi
(74) *Attorney, Agent, or Firm* — Sheridan Ross P.C.

(57) ABSTRACT

A contact is received in a contact center. For example, an incoming voice call or email is received by the contact center. A complexity of the contact is determined. The complexity of the contact is how difficult the contact will be to process by an agent. For instance, the agent may have to do additional work outside the call based on the type of contact. In response to determining the complexity of the contact, the contact is routed to an agent of the contact center and a compensation of the agent is adjusted for servicing the contact.
The systems and methods can also work for multiple contacts that are processed by multiple agents. In addition, the systems and methods will work with outbound contacts.

20 Claims, 4 Drawing Sheets

MANAGING TRANSACTION COMPLEXITY IN A CONTACT CENTER

TECHNICAL FIELD

The systems and methods relate to contact centers and in particular to managing contact complexity in a contact center.

BACKGROUND

Contact centers use various metrics to quantify performance of agents in the contact center. For example, some contact centers use the average time that the agent takes to handle a contact as a metric to determine the agent's performance. This method of rating the agent's performance in relation to other agents works well when all the contacts are similar. However, in many environments, using these kinds of metrics results in some agents of the contact center being penalized for handling contacts that may be difficult.

For example, if an agent handles a high proportion of contacts that are difficult and thus takes a much longer time to handle the difficult contacts, the end result is that the agent's average time to handle a contact will be higher than another agent that is handling mostly easy contacts. In many cases, the agent that is handling the easier contacts may not be able to work the difficult cases because of lack of expertise. In this example, the agent who handles the easier contacts would be rated higher than the agent that takes the more difficult contacts. This can result in frustration and may ultimately lead to loss of key assets to the contact center. What is needed is a way to fairly account for the complexities of different types of contacts.

SUMMARY

Systems and methods are provided to solve these and other problems and disadvantages of the prior art. A contact is received in a contact center. For example, an incoming voice call or email is received by the contact center. A complexity of the contact is determined. The complexity of the contact is how difficult the contact will be to process by an agent. For instance, the agent may have to do additional work outside the call based on the type of contact. In response to determining the complexity of the contact, the contact is routed to an agent of the contact center and a compensation of the agent is adjusted for servicing the contact.

The systems and methods can also work for multiple contacts that are processed by multiple agents. In addition, the systems and methods will work with outbound contacts.

DETAILED DESCRIPTION

Figure 1:
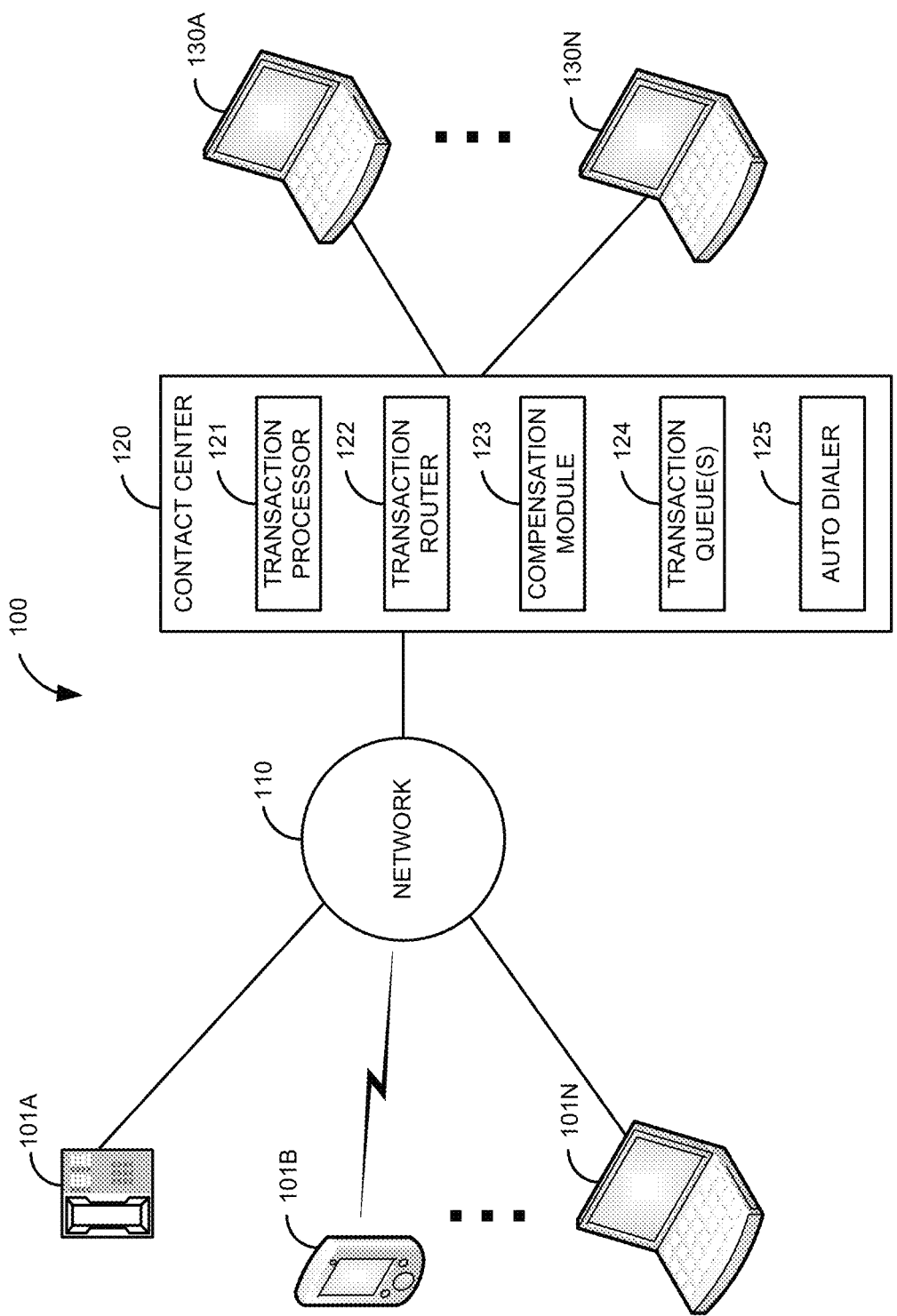
FIG. 1 is a block diagram of a first illustrative system for managing contact complexity in a contact center.

FIG. 1 is a block diagram of a first illustrative system 100 for managing contact complexity in a contact center 120. The first illustrative system 100 comprises communication devices 101A-101N, a network 110, a contact center 120, and agent terminals 130A-130N.

The communication device 101 may be any device that can communicate on the network 110, such as a Personal Computer (PC), a telephone, a video system, a cellular telephone, a Personal Digital Assistant (PDA), a tablet device, a notebook device, and the like. As shown in FIG. 1, any number of communication devices 101A-101N may be connected to network 110, including only a single communication device 101. In addition, the communication device 101 may be directly connected to the contact center 120.

The network 110 can be any network that can send and receive information, such as the Internet, a Wide Area Network (WAN), a Local Area Network (LAN), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), Integrated Services Digital Network (ISDN), video protocols, email protocols, text protocols, and the like.

The contact center 120 can be any hardware/software that can handle contacts, such as, a call center, a Private Branch Exchange (PBX), a switching system, a voice switch, a video switch, a router, a communication system, an email system, an Instant Messaging (IM) system, a text messaging system, a video system, and/or the like. The contact center 120 can handle different kinds of contacts, such as voice contacts, video contacts, email contacts, Instant Messaging (IM) contacts, text contacts, and/or the like. A contact is with a person that generates the voice contact, the video contact, the email contact the IM contact, and/or the text contact.

The contact center 120 further comprises a contact processor 121, a contact router 122, a compensation module 123, a contact queue(s) 124, and an auto dialer 125. Although the contact center 120 is shown comprising elements 121-125, in some embodiments, different elements 121-125 can be distributed across multiple contact centers 120 and/or multiple devices, including devices in the network 110 Likewise, some or portions of elements 121-125 may be included in the communication devices 101A-101N. In other embodiments, the contact center 120 may not include all of the elements 121-125. For example, the contact center 120 may not include the contact queue(s) 124 and/or the auto dialer 125.

The contact processor 121 can be any hardware/software that can process contacts, such as a voice call processor, a video call processor, a text message processor, an Instant Messaging processor, an email processor, and/or the like. The contact processor 121 can handle all the same types of contacts and/or different types of contacts. For example, in one embodiment, the contact processor 121 can handle voice and email contacts.

The contact router 122 can be any hardware/software that can route a contact, such as a router, a such as a voice call processor, a video call processor, a text message processor, an Instant Messaging processor, an email processor, and/or the like. The compensation module 123 can be any hardware/software that defines compensation for an agent. The compensation module 123 is used to adjust compensation of agents in the contact center 120.

The contact queue(s) 124 can be any hardware/software that can hold or manage contacts. The contact queue(s) 124 may be used to handle inbound contacts and/or outbound contacts. For example, the contact queue(s) 124 may be used to handle contacts based on a First-In-First-Out (FIFO) method. The contacts queue(s) 124 may comprise separate contact queue(s) 124 for different types of contacts. For instance, one contact queue 124 may be used for voice contacts and another contact queue 124 may be used for Instant Messaging (IM) contacts. In one embodiment, the contact queue 124 may be used for both inbound and outbound contacts.

The auto dialer 125 can be any hardware/software that can automatically dial contacts. For example, the auto dialer 125 can dial telephone numbers for outbound voice or video contacts to be processed within the contact center 120. Alternatively, the auto dialer 125 can initiate email contacts by sending out emails based on a defined list of potential customers.

The agent terminals 130A-130N can be any device that can be used by an agent to handle contacts, such as the communication device 101, a terminal, and/or the like. In FIG. 1, the agent terminals 130A-130N are shown directly connected to the contact center 120. However, in other embodiments, the agent terminals 130A-130N can be connected to the contact center via the network 110 or another network. In addition, the agent terminals 130A-130N can be local and/or remote to the contact center 120.

The contact processor 121 gets a contact. The contact processor 121 can get a contact in various ways. For example, the contact processor 121 can get an inbound contact, such as an email, a voice call, or a text message directly from one of the communication device 101A, 101B, or 101N. In another embodiment, the contact processor 121 can get an inbound contact, such as a voice, video, text, or Instant Messaging (IM) contact via the contact queue(s) 124. Alternatively, the communication processor 121 can get the contact based on the auto dialer 125 making an outbound contact. The contact processor 121 can get a plurality of contacts that can include inbound contacts and/or outbound contacts.

The contact processor 121 determines a complexity of the contact. The complexity of the contact can be determined in various ways. The complexity of the contact can be based on content of the contact or previous contacts. For example, the complexity of the contact can be based on a number of issues in the contact, an historical complexity of a prior contact with a customer, a first time resolution for a type of the contact, a demographic of the customer, a time resolution for a second contact based on a same issue, and/or the like.

In another embodiment, the complexity of the contact can be based on a value of the contact to a business. The business can be a business that owns the contact center 120 and/or is represented by the contact center 120. The complexity of the contact can be based on a value of a customer associated with the contact, a use of a product by the customer associated with the contact, a use of a service by the customer associated with the contact, an amount of money spent by the customer, and/or the like.

In another embodiment, the complexity of the contact can be based on a customer associated with the contact. For example, the complexity of the contact can be based on a history of dissatisfaction by a customer, a history of satisfaction by the customer, a number of errors made in regard to the customer, a note made by one or more agents about the customer, and/or the like.

In another embodiment, the complexity of the contact can be based on an outbound contact. For example, the complexity of the contact can be based on a region of the country that outbound contact is being made to, based on a country that the outbound contact is being made to, based on a language/dialect spoken by the outbound contact, based on a prior contact, based on a blog site associated with the contact, based on a number of followers of the contact, and/or the like.

Based on the complexity of the contact, the contact router 122 routes the contact to an agent of the contact center 120 (via the agent terminal 130). The contact router 122 can route the contact to the agent based on various factors associated with the complexity of the contact. The contact router 122 can route a contact to a specific agent based on a specific demographic of a customer. For example, contacts from a specific region of the country may be routed differently because the contact may be more difficult, but may also yield more profit on a sale. Alternatively, the contact router 122 may route the contact based on an historical complexity of previous contacts from the same customer. For instance, if previous contacts from the same customer have taken less time (less complex), the contact router 122 may route the contact to a different agent or set of agents.

In one embodiment, the contact may also be routed based on a value of the contact to the agent. For example, the agent may have a profile that indicates that the agent likes to handle a specific product or a specific type of customer. This information can then be used in addition to the complexity of the contact to route the contact to the agent.

The compensation module 123 adjusts a compensation of the agent based on the complexity of the contact. The compensation of the agent can be in various forms, such as a monetary value, a break period for the agent, a period of vacation for the agent, a gift card, a bonus, a recognition, and/or the like.

To illustrate, consider the following examples. The contact center 120 provides customer service for health insurance customers. A customer makes a voice call into the contact center via the communication device 101B. The call is placed in the contact queue 124. The contact processor 121 gets the voice call from the customer from the contact queue 124. Based on input from an Interactive Voice Response (not shown) system, the customer has indicated that the contact is in regard to an issue with a bill for chemotherapy. In addition, the customer has also indicated that he has an issue with a denial of a prescription bill. Based on the chemotherapy issue (chemotherapy issues usually take three times longer) and the prescription issue (a second issue in the contact), the contact processor 121 determines that overall, the contact will likely take four times longer than a regular contact.

The contact router 122 determines that an agent (Tom) is the best agent to handle this type of contact because Tom has over 5 years experience in dealing with difficult chemotherapy contacts. The contact router 122 routes the contact to Tom. The compensation module 123 adjusts the compensation for Tom from 5 dollars (the compensation for a regular contact) to 20 dollars for handling the more complex contact.

In another example, the contact center 120 is responsible for sales of Product ABC. Sales for the contact center 120 involve inbound contacts where customers call in to purchase the product ABC. In addition, when there are not any inbound calls, the auto dialer 125 makes outbound calls for the agents to sell the Product ABC. Typically, the inbound calls are much easier because the callers are ready to make a purchase. The outbound calls are more difficult because the calls are cold calls and take longer (i.e., in the number of calls and/or the time to get a sale). The agents of the contact center 120 are compensated on the number of sales they make. Because the inbound calls are less complex, the compensation to the agents of the contact center 120 is less for any sale based on an inbound call. Conversely, because the outbound calls are more complex, the compensation to the agents for a sale based on an outbound call is greater.

The contact center 120 has two agents (Jim and Sally). Sally has more sales experience and better skills for making sales for outbound calls. Jim is a new agent. The contact router 122, based on the skill level of the two agents and the complexity of the contact, routes more of the outbound calls to Sally based on Sally's experience in selling Product ABC via outbound calls. The contact router 122 routes more of the inbound calls to Jim because they are easier for a new agent to handle. Sally and Jim are compensated more for making a sale of an outbound call versus making a sale from an inbound call. Even though Sally may have less over sales, Sally may actually be compensated more than Jim because of a higher number of outbound sales.

Figure 2:
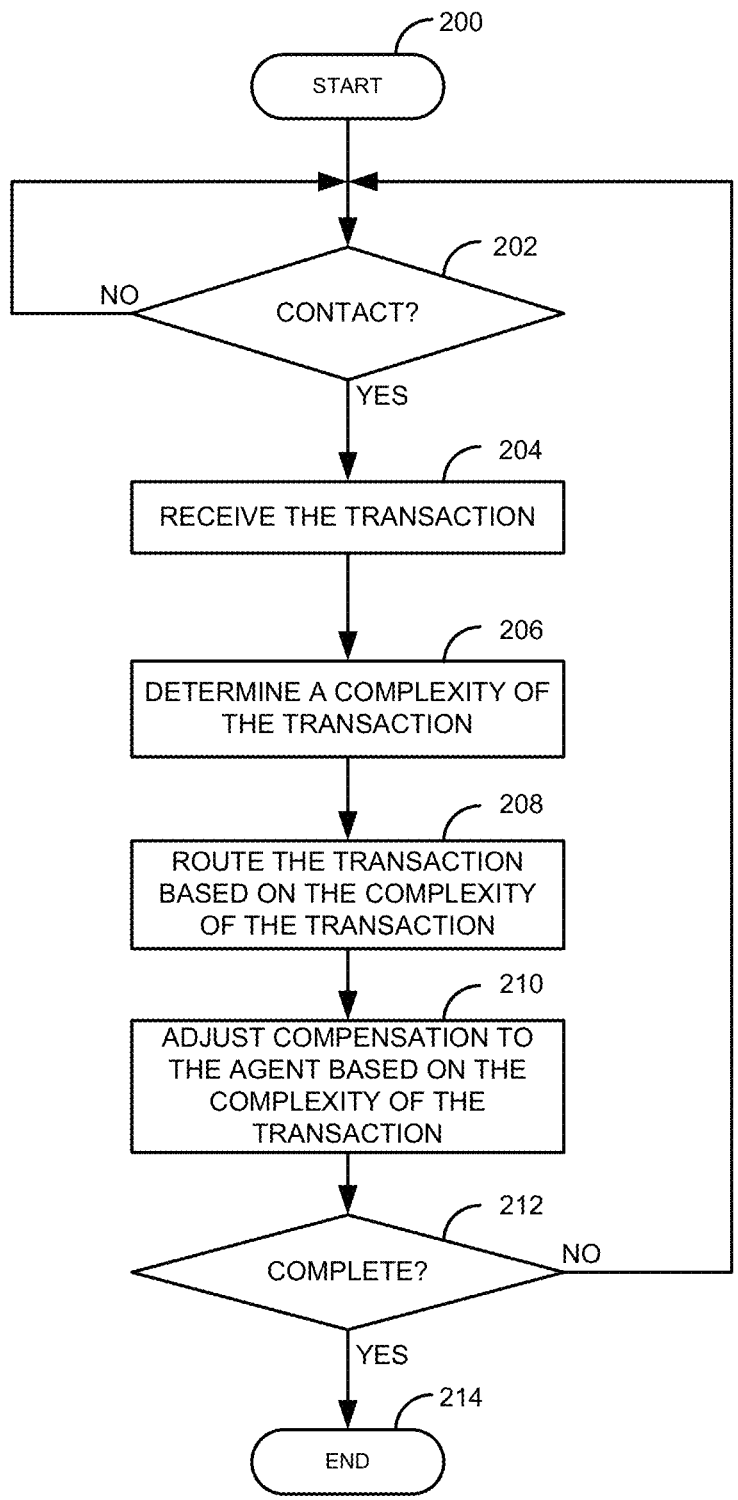
FIG. 2 is a flow diagram of a method for managing contact complexity in a contact center.
Figure 3:
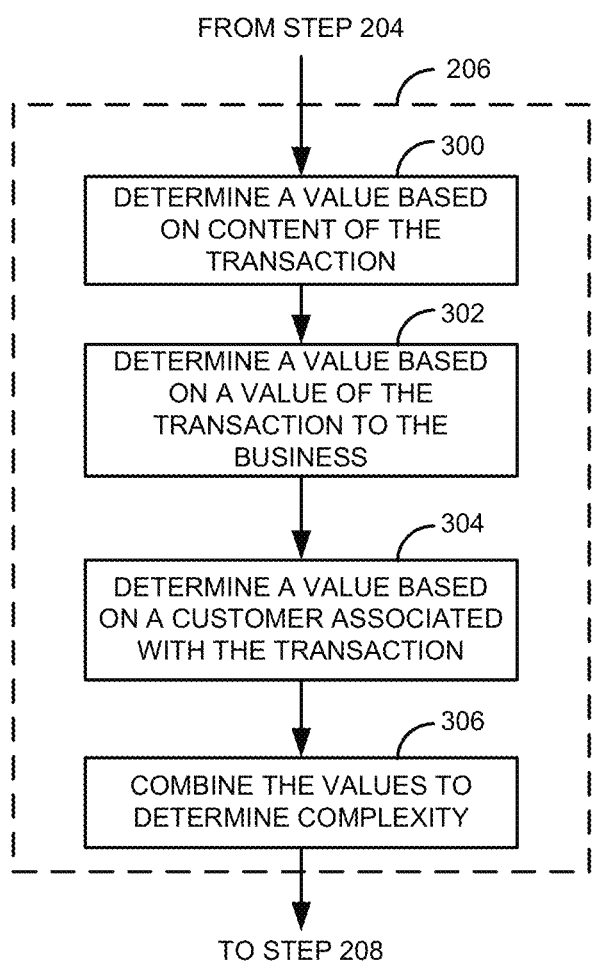
FIG. 3 is a flow diagram of a method for determining a complexity of a contact.
Figure 4:
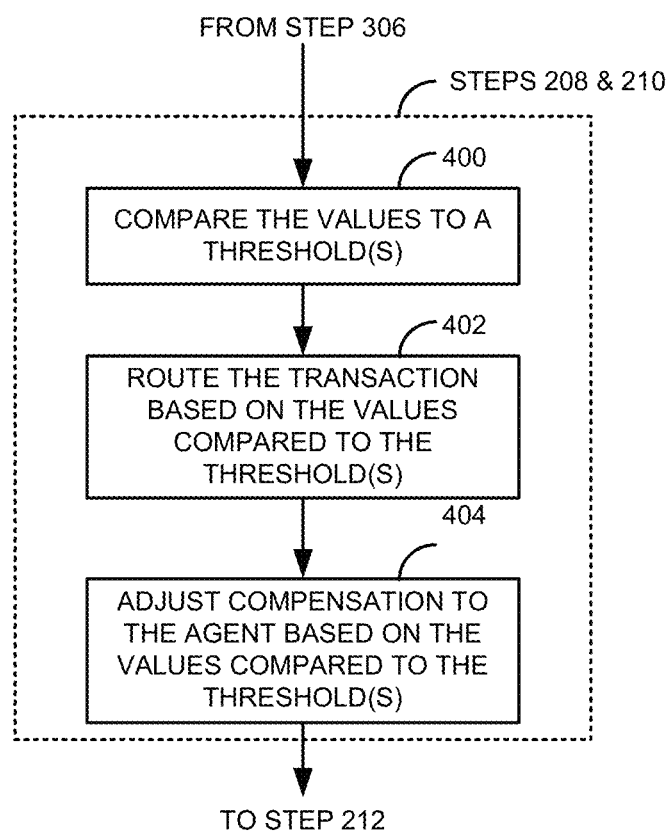
FIG. 4 is a flow diagram of a method for routing and adjusting compensation based on a complexity of a contact.

FIG. 2 is a flow diagram of a method for managing contact complexity in a contact center. Illustratively, the communication devices 101A-101N, the contact center 120, the contact processor 121, the contact router 122, the compensation module 123, the contact queue(s) 124, and the auto dialer 125 are stored-program-controlled entities, such as a computer or processor, which performs the method of FIGS. 2-4 and the processes described herein by executing program instructions stored in a tangible computer readable storage medium, such as a memory or disk. Although the methods described in FIGS. 2-4 are shown in a specific order, one of skill in the art would recognize that the steps in FIGS. 2-4 may be implemented in different orders and/or be implemented in a multi-threaded environment. Moreover, various steps may be omitted or added based on implementation.

The process starts in step 200. The process determines in step 202 if a contact is ready. A contact can be ready based on various factors, such as being added to a contact queue, being received, based on an auto dialer making a call, based on reaching a point in a contact queue, and/or the like. If a contact is not ready in step 202, the process repeats step 202. Otherwise, if the contact is ready in step 202, the process gets 204 the contact.

The process determines 206 a complexity of the contact. The process routes 208 the contact based on the complexity of the contact. The process adjusts 210 compensation to the agent based on the complexity of the contact. The process determines in step 212 if the process is complete. If the process is not complete in step 212, the process goes to step 202. Otherwise, if the process is complete in step 212, the process ends 214.

FIG. 3 is a flow diagram of a method for determining a complexity of a contact. The process of FIG. 3 is an exemplary embodiment of step 206 in FIG. 2. After getting the contact in step 204, the process determines 300 a value based on content of the contact. The content of the contact can be based on various types of information, such as based on a customer speaking, based on the customer making a selection, based on text in the contact, based on a gesture by the customer, based on a customer using menus in an Interactive Voice Response (IVR) system, based on video content of the contact, based on a handle of the customer, based on a telephone number of the contact, based on an email address of the contact, based on a posting on a blog in regard to the contact, and/or the like.

The content of the contact can be used to determine a complexity based on various factors, such as a number of issues in the contact (e.g., a list of issues in an email), the customer has identified that he/she is using a second language, a phone number that identifies a location of where the contact is calling from, language used in the contact (e.g., profanity), a product identified in the contact (e.g., based on an IVR selection), a service identified in the contact, a gesture (i.e., in a video contact), and/or the like.

The process determines 302 a value based on a value of the contact to a business (e.g., the owner of the contact center or a company represented by the contact center). The value of the contact to the business can be determines in various ways, such as based a value of a customer associated with the contact, a use of a product by the customer associated with the contact, a use of a service by the customer associated with the contact, and an amount of money spent by the customer, an association with the customer, and/or the like.

The process determines 304 a value based on a customer associated with the contact. The value based on a customer associated with the contact can be determined in various ways, such as based on a history of dissatisfaction by a customer, based on a history of satisfaction by the customer, based on a number of errors made in regard to the customer, based on a note made by one or more agents in regard to the customer, and/or the like.

The process adds 306 the values (from steps 300, 302, and 304) to determine the complexity of the contact. The process then goes to step 208. Although the above process is shown requiring steps 300, 302, and 304, one of skill in the art would recognize that different combinations of steps 300, 302, and 304 may be used. For example, the process may only use one or two of steps 300, 302, and/or 304.

To illustrate consider the following example. Assume that the contact is an email sent from a customer (Bill) to the contact center. The process determines 300 that the email (the contact) contains profane language. Based on this, the process assigns a value of 15 to the contact (the higher the number the more difficult the contact is). The process determines 302 that this customer (Bill) is a key customer that purchases a lot of products from the company and assigned a value of 20 as a value to the business. The process determines 304 a value based on the caller (Bill). The value is based on previous note of an agent that indicates that Bill has a history of being satisfied in the past and is easy to work with. The process assigns a value of 0 to Bill because it is likely not going to be difficult to resolve the issue with Bill. The process adds up the values (15, 20, and 0) to give a complexity value of 35 to this contact. The process can then compare this number to one or more predefined thresholds as described in FIG. 4.

FIG. 4 is a flow diagram of a method for routing and adjusting compensation based on a complexity of a contact. After adding the values to determine a complexity in step 306, the process compares 400 the added values from step 306 to one or more thresholds. For example, the process may have defined two thresholds (based on a scale of 0 to 100): 30 indicating a medium difficulty of the contact and 60 indicating a high difficulty of the contact. The added value (e.g., 35 from the above example) is compared to the two thresholds. Since the added value is 35, the process determines a medium difficulty for the contact from Bill.

The process routes 402 the contact based on the added values compared to the threshold(s). For example, the contact may be routed differently if the added value was over 60 versus the added value being under 60. In one embodiment, the process routs the contacts based on an even distribution of similar complex contacts. For example, if the contact center has 10 agents, the process may route medium difficulty contacts evenly amongst the 10 agents so that the 10 agents handle a similar number of medium contacts Likewise, the contact center can route high difficulty contacts in a similar manner. This would make the use of metrics such as average time to complete a contact more accurate in determining an agent's actual productivity and value to the contact center.

The process adjusts 404 the compensation to the agent based on the added values compared to the threshold(s) and then goes to step 212. For example, in the above example, the process could add additional compensation to the agent for any contact with an added value of over 30. If the value was over 60, the process can adjust the compensation for the agent at an even higher level.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   receiving, by a processor, an electronic transaction in a contact center;
   determining, by the processor, a complexity metric of the electronic transaction, based on a value reaching a threshold, wherein the value is based on: a networked blog site associated with the electronic transaction and a number of followers of the electronic transaction on the networked blog site; and
   in response to determining the complexity metric of the electronic transaction:
   routing, by the processor, the electronic transaction to an agent of the contact center; and
   adjusting, by the processor, a compensation of the agent for servicing the electronic transaction.

2. The method of claim 1, wherein the electronic transaction further comprises a plurality of inbound and outbound electronic transactions and wherein the compensation of the agent is based a complexity metric of the plurality of inbound and outbound electronic transactions.

3. The method of claim 2, wherein the plurality inbound electronic transactions are less complex than the plurality outbound electronic transactions and the compensation is adjusted by providing less compensation for the inbound electronic transactions than the outbound electronic transactions.

4. The method of claim 1, wherein the complexity metric of the electronic transaction is also based on at least one of: a number of issues in the electronic transaction, a historical complexity metric of a prior electronic transaction with a customer, a first time resolution for a type of the electronic transaction, and a demographic of the customer.

5. The method of claim 1, wherein the complexity metric of the electronic transaction is also based on at least one of: a value of a customer associated with the electronic transaction, a use of a product by the customer associated with the electronic transaction, a use of a service by the customer associated with the electronic transaction, an amount of money spent by the customer, and an association with the customer.

6. The method of claim 1, wherein the complexity metric of the electronic transaction is also based on at least one of: a history of dissatisfaction by a customer, a history of satisfaction by the customer, a number of errors made in regard to the customer, and a note made by one or more agents.

7. The method of claim 1, wherein the complexity metric of the electronic transaction is determined based on a threshold, wherein the threshold is determined based on content of the electronic transaction, a value of the electronic transaction to a business, and a customer associated with the electronic transaction.

8. The method of claim 1, wherein routing the electronic transaction to the agent is accomplished based on an even distribution of similar complex electronic transactions to different agents of the contact center.

9. The method of claim 1, wherein determining the complexity metric of the electronic transaction is also based on a number of errors made in regard to a customer.

10. The method of claim 1, wherein determining the complexity metric of the electronic transaction is also based on one or more of: a region of a country that an outbound electronic transaction is being made to and a language/dialect spoken in the outbound electronic transaction.

11. A system comprising:
    a transaction processor configured to receive an electronic transaction in a contact center and determine a complexity metric of the electronic transaction, based on a value reaching a threshold, wherein the value is based on a networked blog site associated with the electronic transaction and based on a number of followers of the electronic transaction on the networked blog site;
    a transaction router configured to route the electronic transaction to an agent of the contact center based on the complexity metric of the electronic transaction; and
    a compensation module configured to adjust a compensation of the agent for servicing the electronic transaction based on the complexity metric of the electronic transaction.

12. The system of claim 11, wherein the electronic transaction further comprises a plurality of inbound and outbound electronic transactions and wherein the compensation of the agent is based a complexity metric of the plurality of inbound and outbound electronic transactions.

13. The system of claim 12, wherein the plurality inbound electronic transactions are less complex than the plurality outbound electronic transactions and the compensation is adjusted by providing less compensation for the inbound electronic transactions than the outbound electronic transactions.

14. The system of claim 11, wherein the complexity metric of the electronic transaction is also based on at least one of: a number of issues in the electronic transaction, a historical complexity metric of a prior electronic transaction with a customer, a first time resolution for a type of the electronic transaction, and a demographic of the customer.

15. The system of claim 11, wherein the complexity metric of the electronic transaction is also based on at least one of: a value of a customer associated with the electronic transaction, a use of a product by the customer associated with the electronic transaction, a use of a service by the customer associated with the electronic transaction, an amount of money spent by the customer, and an association with the customer.

16. The system of claim 11, wherein the complexity metric of the electronic transaction is also based on at least one of: a history of dissatisfaction by a customer, a history of satisfaction by the customer, a number of errors made in regard to the customer, and a note made by one or more agents.

17. The system of claim 11, wherein the complexity metric of the electronic transaction is determined based on a threshold, wherein the threshold is determined based on content of the electronic transaction, a value of the electronic transaction to a business, and a customer associated with the electronic transaction.

18. The system of claim 11, wherein routing the electronic transaction to the agent is accomplished based on an even distribution of similar complex electronic transactions to different agents of the contact center.

19. The system of claim 11, wherein determining the complexity metric of the electronic transaction is also based on a number of errors made in regard to a customer.

20. A non-transient computer readable medium having stored thereon instructions that cause a processor to execute a method, the method comprising:
- instructions to receive an electronic transaction in a contact center;
- instructions to determine a complexity metric of the electronic transaction, based on a value reaching a threshold, wherein the value is based on a networked blog site associated with the electronic transaction and based on a number of followers of the electronic transaction on the networked blog site; and
- in response to determining the complexity metric of the electronic transaction:
  - instructions to route the electronic transaction to an agent of the contact center; and
  - instructions to adjust a compensation of the agent for servicing the electronic transaction.

* * * * *